United States Patent
Honjo (10) Patent No.: US 10,430,457 B2
(45) Date of Patent: Oct. 1, 2019

(54) IMAGE PROCESSING APPARATUS, IMAGE PROCESSING METHOD, SEARCH APPARATUS, SEARCH METHOD, AND NON-TRANSITORY COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/585,695

(22) Filed: May 3, 2017

(65) Prior Publication Data

US 2017/0329775 A1 Nov. 16, 2017

(30) Foreign Application Priority Data

May 13, 2016 (JP) .................... 2016-097386

(51) Int. Cl.
*G06F 16/583* (2019.01)
*G06T 7/33* (2017.01)
*G06T 7/90* (2017.01)
*H04N 5/247* (2006.01)

(52) U.S. Cl.
CPC .......... *G06F 16/5838* (2019.01); *G06T 7/337* (2017.01); *G06T 7/90* (2017.01); *H04N 5/247* (2013.01)

(58) Field of Classification Search
CPC ....... G06F 17/3025; G06T 7/337; G06T 7/90; H04N 5/247
USPC .......................................................... 348/28
See application file for complete search history.

(56) References Cited

U.S. PATENT DOCUMENTS

| | | | | |
|---|---|---|---|---|
| 5,311,293 A | * | 5/1994 | MacFarlane | A45D 44/005 356/421 |
| 6,081,276 A | | 6/2000 | Delp | |
| 2006/0087517 A1 | * | 4/2006 | Mojsilovic | H04N 1/644 345/593 |
| 2009/0002517 A1 | * | 1/2009 | Yokomitsu | G06K 9/00771 348/223.1 |
| 2011/0087677 A1 | * | 4/2011 | Yoshio | G06F 17/30793 707/749 |

(Continued)

FOREIGN PATENT DOCUMENTS

| | | |
|---|---|---|
| JP | 2002016935 A | 1/2002 |
| JP | 2008-225887 A | 9/2008 |

OTHER PUBLICATIONS

Joshi, "Color Calibration for Arrays of Inexpensive Image Sensors," Stanford University, Mar. 1, 2004, 30 pages.

(Continued)

*Primary Examiner* — Frederick D Bailey
*Assistant Examiner* — Matthew David Kim
(74) *Attorney, Agent, or Firm* — Carter, DeLuca & Farrell LLP (57) ABSTRACT

A captured image obtained by capturing a surface on which a color chart is disposed such that color information representing a color included in the color chart can be derived is acquired, the color information is derived from the captured image, and the color of the color chart that is contained in the captured image is extracted. Then, the derived color information and the extracted color are registered in association with each other.

10 Claims, 7 Drawing Sheets

| R | G | B | COLOR NAME |
|---|---|---|---|
| 0 | 0 | 0 | BLACK |
| 1 | 0 | 0 | BLACK |
| ... | ... | ... | ... |
| 128 | 192 | 0 | GREEN, YELLOW |
| ... | ... | ... | ... |
| 192 | 128 | 0 | ORANGE, RED |
| ... | ... | ... | ... |
| 255 | 255 | 254 | PINK, WHITE, YELLOW |
| 255 | 255 | 255 | PINK, WHITE, YELLOW |

(56) References Cited

U.S. PATENT DOCUMENTS

| | | | |
|---|---|---|---|
| 2013/0021496 A1* | 1/2013 | Ranbro | H04N 9/735 |
| | | | 348/223.1 |
| 2013/0242361 A1* | 9/2013 | Matsumoto | H04N 1/6044 |
| | | | 358/504 |
| 2014/0153821 A1 | 6/2014 | Masuko et al. | |
| 2014/0214802 A1 | 7/2014 | Moroney et al. | |
| 2014/0321712 A1* | 10/2014 | Ciurea | H04N 13/232 |
| | | | 382/106 |
| 2018/0045572 A1* | 2/2018 | Harada | B41J 2/525 |

OTHER PUBLICATIONS

Jung et al., "Color Correction Method Using Gray Gradient Bar for Multi-View Camera System," Proceedings of the Korean Society of Broadcast Engineers Conference, Dec. 31, 2009, 6 pages.

Extended European Search Report dated Aug. 7, 2017 in corresponding European Patent Application No. 17000734.8, 12 pages.

Van De Weijer et al., "Learning Color Names for Real-World Applications," IEEE Transactions on Image Processing, Mar. 4, 2009, pp. 1-24.

Viola et al., "Rapid Object Detection Using a Boosted Cascade of Simple Features," Proceedings of the 2001 IEEE Computer Society Conference on Computer Vision and Pattern Recognition, Dec. 2001, pp. 1-9.

Japanese Office Action for application No. 2016-097386 dated Jan. 8, 2019 with English translation (6 pages).

* cited by examiner

| R | G | B | COLOR NAME |
|---|---|---|---|
| 0 | 0 | 0 | BLACK |
| 1 | 0 | 0 | BLACK |
| ... | ... | ... | ... |
| 128 | 192 | 0 | GREEN, YELLOW |
| ... | ... | ... | ... |
| 192 | 128 | 0 | ORANGE, RED |
| ... | ... | ... | ... |
| 255 | 255 | 254 | PINK, WHITE, YELLOW |
| 255 | 255 | 255 | PINK, WHITE, YELLOW |

IMAGE PROCESSING APPARATUS, IMAGE PROCESSING METHOD, SEARCH APPARATUS, SEARCH METHOD, AND NON-TRANSITORY COMPUTER-READABLE STORAGE MEDIUM

BACKGROUND OF THE INVENTION

Field of the Invention

The present invention relates to a technique for image search.

Description of the Related Art

In recent years, image search systems have been proposed that search for, from among a large amount of images, an image in which a specific object is shown. In such image search systems, it is particularly useful to search for a specific person. Various possible search keys are conceivable, and the color of the clothing worn by the person can be used as a search key, for example. In this case, the colors contained in the image are converted in advance into color names by using a table prepared in advance, and a search key can be designated by using a color chart or a color name.

When a large amount of images are captured by a camera under different environments, depending on the difference in the camera installation environments such as lighting and indoor/outdoor environments, a color that can be recognized as "yellow" under a given environment may appear "orange" under a lighting environment having a low color temperature. Under lighting having a higher color temperature, the aforementioned color may appear "greenish-yellow". In other words, the color of the same object may be recorded at different RGB values. When the RGB value of a color exceeds the range of the RGB value representing a given color name, the color is converted as a different color name, thus possibly causing a search omission.

Japanese Patent Laid-Open No. 2008-225887 discloses a technique for recognizing a target present in an image that has been captured by a camera, removing the influence of a light source under the image-capturing environment from the recognized target, and converting the target into color information under a standard light source.

However, under an ambient light, such as a sodium lamp, having poor color rendering properties, the method disclosed in Japanese Patent Laid-Open No. 2008-225887 cannot necessarily convert the color into a color under a standard light source in an accurate manner. When a color is converted into a color name in such a state, the color may not be converted into a correct color name, resulting in the possibility that the color may be omitted from search when the search is carried out with the color name.

SUMMARY OF THE INVENTION

The present invention has been made in view of such a problem, and provides a technique for enabling search of an object whose image has been captured under different image-capturing environments, by using the desired color name.

According to the first aspect of the present invention, there is provided an image processing apparatus comprising: an acquisition unit configured to acquire a captured image obtained by capturing a surface on which a color chart is disposed such that color information representing a color included in the color chart can be derived; a derivation unit configured to derive the color information from the captured image; an extraction unit configured to extract the color of the color chart that is contained in the captured image; and a registration unit configured to register the color information derived by the derivation unit and the color extracted by the extraction unit in association with each other.

According to the second aspect of the present invention, there is provided a search apparatus for searching for an image registered by an image processing apparatus having an acquisition unit configured to acquire a captured image obtained by capturing a surface on which a color chart is disposed such that color information representing a color included in the color chart can be derived; a derivation unit configured to derive the color information from the captured image; an extraction unit configured to extract the color of the color chart that is contained in the captured image; a registration unit configured to register the color information derived by the derivation unit and the color extracted by the extraction unit in association with each other; a second acquisition unit configured to acquire an image of an object; a second extraction unit configured to extract a color of the object that is contained in the image acquired by the second acquisition unit; and a second registration unit configured to register the image acquired by the second acquisition unit and the color extracted by the second extraction unit in association with each other, the search apparatus comprising: a search unit configured to search for an image registered by the second registration unit in association with a color that is among colors registered by the second registration unit and whose color information registered by the registration unit in association with the color matches color information that has been input as a query; and a unit configured to output a result of search performed by the search unit.

According to the third aspect of the present invention, there is provided an image processing method comprising: acquiring a captured image obtained by capturing a surface on which a color chart is disposed such that color information representing a color included in the color chart can be derived; deriving the color information from the captured image; extracting the color of the color chart that is contained in the captured image; and registering the derived color information and the extracted color in association with each other.

According to the fourth aspect of the present invention, there is provided a search method for searching for an image registered by an image processing method having acquiring a captured image obtained by capturing a surface on which a color chart is disposed such that color information representing a color included in the color chart can be derived; deriving the color information from the captured image; extracting the color of the color chart that is contained in the captured image; registering the derived color information and the extracted color in association with each other; acquiring an image of an object; extracting a color of the object that is contained in the acquired image; and registering the acquired image and the extracted color in association with each other, the search method comprising: searching for an image registered in association with a color that is among the registered colors and whose color information registered in association with the color matches color information that has been input as a query; and outputting a result of the search.

According to the fifth aspect of the present invention, there is provided a non-transitory computer-readable storage medium storing a computer program for causing a computer to function as: an acquisition unit configured to acquire a captured image obtained by capturing a surface on which a color chart is disposed such that color information representing a color included in the color chart can be derived; a derivation unit configured to derive the color information from the captured image; an extraction unit configured to extract the color of the color chart that is contained in the captured image; and a registration unit configured to register the color information derived by the derivation unit and the color extracted by the extraction unit in association with each other.

Further features of the present invention will become apparent from the following description of exemplary embodiments (with reference to the attached drawings).

DESCRIPTION OF THE EMBODIMENTS

Hereinafter, embodiments of the present invention will be described with reference to the accompanying drawings. The embodiments described below are intended to illustrate examples of cases where the present invention is specifically implemented, and to represent specific examples of the configurations described in the claims.

First Embodiment

Figure 1:
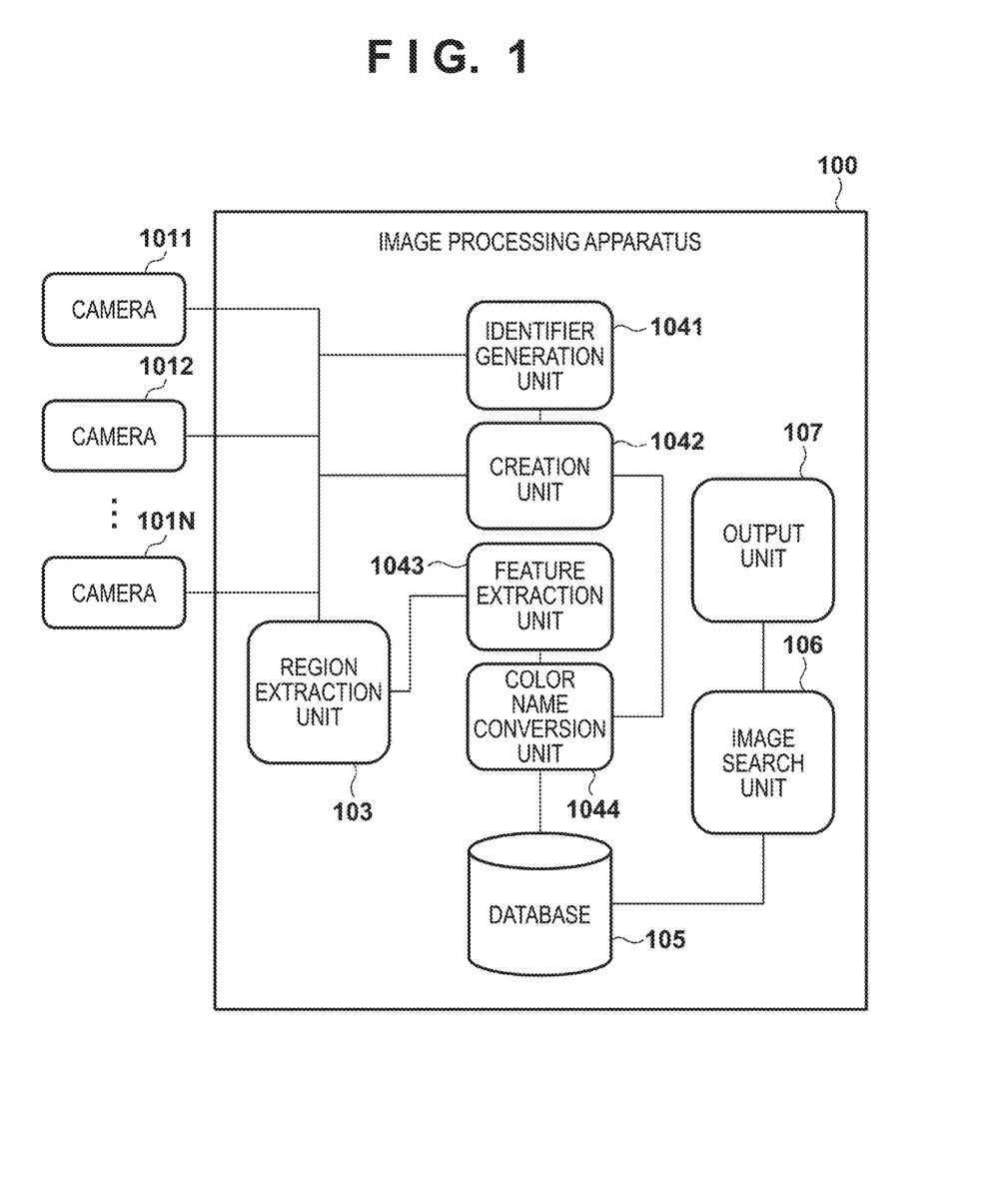
FIG. 1 is a block diagram showing an exemplary configuration of a system.

First, an exemplary configuration of a system according to the present embodiment will be described using the block diagram shown in FIG. 1. As shown in FIG. 1, the system according to the present embodiment includes N (N is an integer of 2 or more) cameras 1011, 1012, . . . , 101N, and an image processing apparatus 100. The cameras 1011, 1012, . . . , 101N and the image processing apparatus 100 are connected via a network such as a LAN or the Internet, and are configured to be able to perform data communication with one another. Note that the network may be a wireless network or a wired network, or may be a combination of a wireless network and a wired network.

First, the cameras 1011, 1012, . . . , 101N will be described. The cameras 1011, 1012, . . . , 101N are installed at locations different from one another, and capture still images or moving images in a set or controlled orientation. Note that the installation layout of the cameras 1011, 1012, . . . , 101N is not limited to any specific installation layout. For example, some of the cameras may be collectively installed in the same area, for example, such that some of the cameras 1011, 1012, . . . , 101N are installed in a room A, and others are installed in a room B. A captured image captured by each of the cameras 1011, 1012, . . . , 101N is input into the image processing apparatus 100. If each of the cameras 1011, 1012, . . . , 101N serves to capture a still image, the captured image is the still image itself. If each of the cameras 1011, 1012, . . . , 101N serves to capture a moving image, the captured image is an image of each of the frames constituting the moving image.

Next, the image processing apparatus 100 will be described. The image processing apparatus 100 has the function of generating various types of information for enabling image search using a color name as a query, based on the captured image acquired from each of the cameras 1011, 1012, . . . , 101N. Further, the image processing apparatus 100 has the function of clipping and registering an image of an object serving as a search target from the captured image acquired by each of the cameras 1011, 1012, . . . , 101N. Further, the image processing apparatus 100 has the function of performing an image search process for searching for, from among registered object images, the desired image, based on a color name that has been input as a query, and outputting the result.

Here, in order to operate the above-described system, each of the cameras 1011, 1012, . . . , 101N first needs to be installed at a prescribed installation location. Then, after each of the cameras 1011, 1012, . . . , 101N has been installed at the prescribed position, the image processing apparatus 100 divides the cameras 1011, 1012, . . . , 101N into camera groups in each of which the cameras capture similar color information. The process performed by the image processing apparatus 100 for this division will be described in accordance with the flowchart shown in FIG. 2A.

Figure 2A:
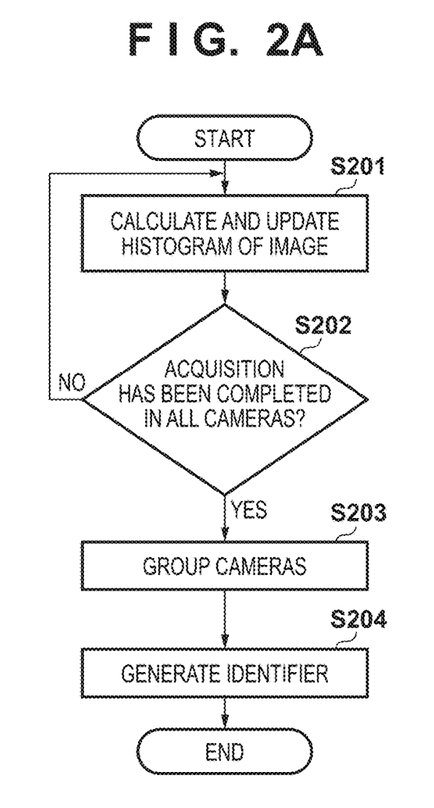
FIGS. 2A to 2D are flowcharts of a process performed by an image processing apparatus 100.

The cameras 1011, 1012, . . . , 101N perform image capturing at a prescribed time interval in a prescribed time period, and output captured images. For example, each of the cameras 1011, 1012, . . . , 101N performs image capturing every 5 minutes for 24 hours, and outputs captured images. At step S201, an identifier generation unit 1041 acquires the captured images respectively output from the cameras 1011, 1012, . . . , 101N. Then, the identifier generation unit 1041 creates, for each camera, an average RGB histogram of the RGB histograms of each of the captured image acquired from the camera. For example, in the case of creating an average RGB histogram of the RGB histograms of each of the captured images acquired from the camera 1011, the identifier generation unit 1041 performs the following process.

Upon acquiring a captured image from the camera 1011, the identifier generation unit 1041 first creates, for all image regions of the captured image as a target, a histogram (RGB histogram) representing the appearance frequencies of the pixel values of the color components R, G, and B. The RGB histogram represents the number of appearances of the pixel value of the R component, the pixel value of the G component, and the pixel value of the B component within a range (e.g., 0 to 255) that the pixel values can take, and the number of bins is 16, for example. The identifier generation unit 1041 creates such an RGB histogram for each of the acquired captured images. Then, after creating the RGB histogram of each of the captured images acquired in a prescribed time period, the identifier generation unit 1041 uses the RGB histograms to create a histogram representing the average of the appearance frequencies of the pixel values of each of the color components R, G, and B during the prescribed time period. The thus created histogram is an average RGB histogram for the camera 1011. By performing the process of creating such an average RGB histogram for the camera 1012, . . . , 101N in the same manner, the average RGB histogram is created for each of the cameras 1011, 1012, . . . , 101N.

At step S202, the identifier generation unit 1041 determines whether an average RGB histogram has been created for each of the cameras 1011, 1012, . . . , 101N. If it is determined, as a result of this determination, that an average RGB histogram has been created for each of the cameras 1011, 1012, . . . , 101N, the process proceeds to step S203. On the other hand, if, among the cameras 1011, 1012, . . . , 101N, there is any camera left for which an average RGB histogram has not been created, the process returns to step S201, at which an average RGB histogram is created for the camera for which an average RGB histogram has not yet been created.

Note that the average RGB histogram is an example of statistical information of each of the RGB histograms, and the statistical information of each of the RGB histograms is not limited to an average RGB histogram.

At step S203, the identifier generation unit 1041 divides the cameras 1011, 1012, . . . , 101N into a plurality of groups, based on the average RGB histogram. Specifically, by using the average RGB histogram that has been created for each of the cameras 1011, 1012, . . . , 101N, the identifier generation unit 1041 divides the cameras 1011, 1012, . . . , 101N into camera groups in each of which the cameras have obtained similar average RGB histograms. For the method for the group division, it is possible to use various methods such as the mean shift method and the K-means method.

Here, each of the cameras 1011, 1012, . . . , 101N outputs not only captured images, but also identification information (camera ID) unique to the camera. Thus, at step S204, the identifier generation unit 1041 issues, for each of the divided groups, identification information (group ID) unique to the group, and manages the group ID and camera IDs of the cameras belonging to the group ID in association with each other.

Figure 2B:
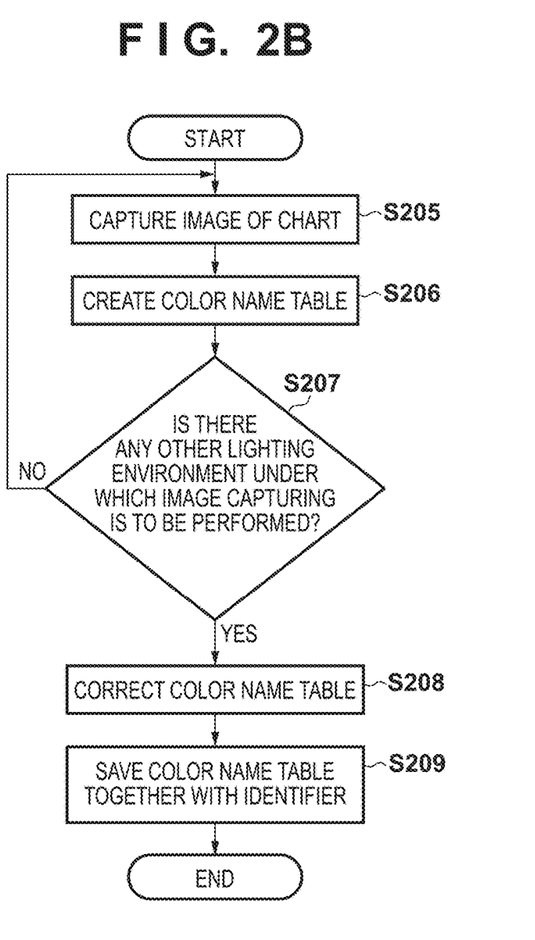

Next, with reference to the flowchart of FIG. 2B, a description will be given of a process for registering, based on captured images obtained when performing image capturing of an image-capturing target under image-capturing environments that are different from one another, the color name of the image-capturing target and the color of the image-capturing target in each of the captured image in association with one another. The flowchart of FIG. 2B shows the process performed for one group. Actually, the process in accordance with the flowchart of FIG. 2B will be performed for each group.

First, one unselected group is selected as a selected group from among the above-described plurality of groups. Further, one camera is selected as a selected camera (selected image capturing device) from among one or more cameras belonging to the selected group. These selections may be performed by the user operating an operation unit (not shown). Alternatively, a creation unit 1042 may select a group in a predetermined order, and select, from among the cameras belonging to the selected group, a camera whose position in the order based on the camera ID is a predetermined position as the selected camera.

As for the method for selecting the selected camera, for example, when the number of camera belonging to the selected group is one, the one camera is selected as the selected camera. When the number of cameras belonging to the selected group is plural, the user may select, from among the plurality of cameras, a camera installed at a location where the image of a sheet, which will be described later, can be easily captured. Alternatively, the user may select a camera installed at a location where variations of a lighting environment, which will be described later, can be easily reflected.

Figure 3A:
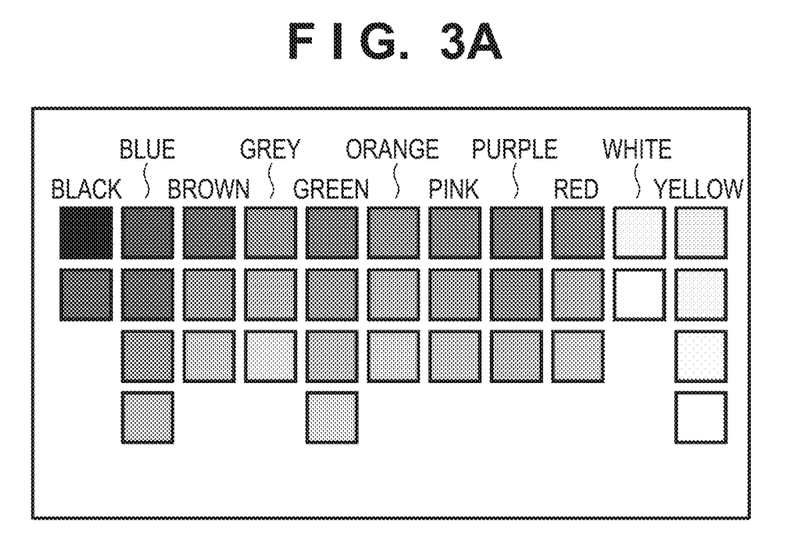
FIG. 3A is a diagram showing an example of a sheet.

At step S205, the creation unit 1042 operates the selected camera to capture an image of a sheet on which a color chart is printed, and acquires the captured image of the sheet that has been captured by the selected camera. FIG. 3A shows an example of the sheet whose image is captured by the selected camera. Patches of colors whose spectral reflectance distributions are known are disposed on the sheet, and the patches disposed on the same column correspond to the same color name. For example, the patches in the left end column differ, for example, in lightness and/or saturation, but are all associated with the color name "black", and therefore, the character string "black" is printed directly above the left-end patch column. Note that the printing position of the character string representing the color name is not limited to a position directly above the patch column. Another object may be used in place of the character string. In that case, it is necessary that the relationship between the object and the color name is known. In FIG. 3A, it is assumed that the color names are classified into 11 colors (black, blue, brown, grey, green, orange, pink, purple, red, white, and yellow) as described in the following document.

J. van de Weijer, C. Schmid, J. Verbeek, and D. Larlus, Learning Color Names for Real-World Applications, IEEE Trans in IP, 2009.

However, the color names are not limited to these, and it is also possible to use system color names prescribed in JIS, commonly used color names, or the like.

Figure 3B:
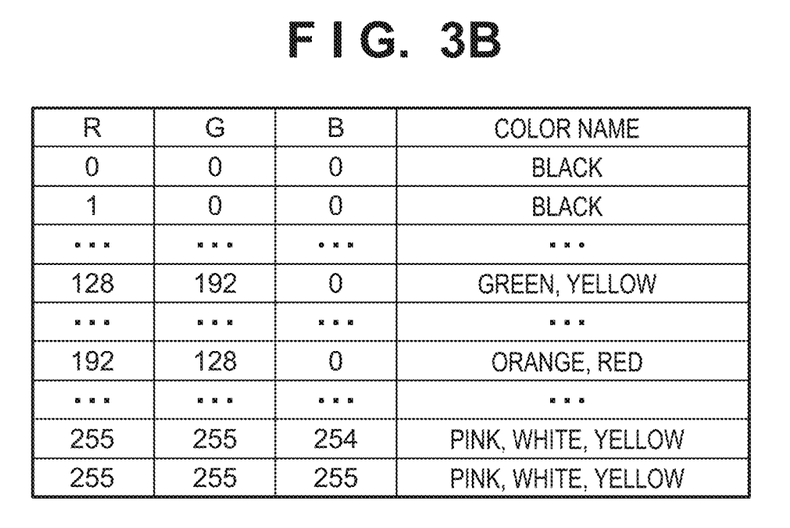
FIG. 3B is a diagram showing an exemplary configuration of a color name table.

Referring back to FIG. 2B, next, at step S206, the creation unit 1042 performs an image recognition process on the captured image, to specify a region of a patch in the sheet that is shown in the captured image, and a region of a character string (or may be an object other than a character string) representing a color name. When there is a distortion in the specified regions, the distortion is corrected by projective transformation. Note that the position of the region in which the character string representing a color name is printed on the sheet and the position of the region in which the patch corresponding to the color name is printed are registered in advance in the image processing apparatus 100 as known information. That is, the position at which the character string of each color name is printed on the sheet, and the position at which the patch corresponding to each color name is printed on the sheet are registered in advance in the image processing apparatus 100 as known information. Thus, upon specifying a region of the sheet by the image recognition process performed on the captured image, the creation unit 1042 specifies, based on the region of the sheet, a region (character string region) of a character string representing a color name and a region of a patch (patch region) by using the above-described known information. Then, the creation unit 1042 recognizes, by a recognition process performed on the specified character string region, the character string representing the color name from the character string region, and extracts the color (RGB value) in the specified patch region, or in other words, the color of the patch on the captured image. Then, the creation unit 1042 registers the recognized character string representing the color name in association with each of the colors of the patches arranged directly below the character string. In the present embodiment, the recognized character string is registered in a table (color name table) as shown in FIG. 3B. In the color name table shown in FIG. 3B, R=0 to 255 is registered in advance in the left end column, G=0 to 255 is registered in advance in the second column from the left end, and B=0 to 255 is registered in advance in the third column from the left end.

Upon extracting the RGB value of the patch from the captured image, the creation unit 1042 specifies the row corresponding to the RGB value in the color name table shown in FIG. 3B. Then, the creation unit 1042 registers, at the right end of the specified row, the character string (character string of the color name) recognized from the character string region in the same columns as the patch. In the example shown in FIG. 3B, the character string "black" is registered at the right end of the row (R, G, B)=(1, 0, 0). This means that the patch having an RGB value of (1, 0, 0) is printed in the same column as the character string "black" on the sheet.

By using such a color name table, "patch color name" shown as a character string on the sheet and the color of the patch on the captured image can be managed in association with each other. However, the configuration of the color name table is not limited to the configuration shown in FIG. 3B as long as the same purpose can be attained.

Note that when the color name table is created with thinned RGB values, for example, when R, G, B are registered as 0, 15, 31, . . . , 255 in the color name table, the row corresponding to the RGB value of a patch extracted from the captured image may not exist. In such a case, from among the RGB values registered in the color name table, the RGB value located at the closest distance to the RGB value of the patch on the color space may be specified, and the character string (character string of the color name) recognized from the character string region in the same column as the patch may be registered at the right end of the row of the specified RGB value. Note that a plurality of color names can be registered at the right end column of the color name table. That is, a plurality of color names can be registered for the same RGB value.

Referring back to FIG. 2B, next, if image capturing has been completed under all of preset image-capturing environments, the process proceeds to step S208 via step S207. On the other hand, if there is any image-capturing environment left for which image capturing has not been completed, the process returns to step S205 in order to perform image capturing under that image-capturing environment.

In the present embodiment, image capturing of the sheet is performed under image-capturing environments that are different from one another. For example, image capturing may be performed on the sheet at a prescribed time interval in a prescribed time period, or the selected camera may perform image capturing on the sheet each time the user inputs an image capturing instruction by operating an operation unit (not shown). Thus, captured images obtained by performing image capturing on the sheet under image-capturing environments that are different from one another are output from the selected camera, and the creation unit 1042 creates a color name table, based on the captured images.

Here, lighting environments are used as an example of the image-capturing environments. Thus, in the present embodiment, the processes of steps S205 and S206 are performed each time the lighting environment changes. A change in the lighting environment refers to a change caused by ON/OFF of lighting, the replacement of a lighting device, or the like in the case of image capturing performed in a room or building without a window, and a change with weather or time, or the like in the case of image capturing performed in a room or building with a window, or outdoor.

In the case of performing image capturing of the sheet at a prescribed time interval in a prescribed time period, the processes of steps S205 and S206 do not need to be performed each time image capturing is performed, and the processes of steps S205 and S206 may be performed if the change in the RGB histogram of the captured image is greater than or equal to a threshold value.

At step S208, the creation unit 1042 searches for an RGB value for which the character string of the corresponding color name is not registered in the color name table, as an unassociated RGB value. Then, the creation unit 1042 specifies an RGB value (only those RGB values for which the corresponding color names are registered) located at the closest Euclidean distance on the RGB space to the unassociated RGB value. Then the creation unit 1042 registers the character string of the color name registered in association with the specified RGB value as the character string representing the color name corresponding to the unassociated RGB value in the color name table. By such a color name table correction process, character strings representing color names can be registered in association with all the RGB values registered in the color name table.

At step S209, the creation unit 1042 registers the color name table created by the above-described process in association with the group ID (which may also be the camera ID of the selected camera) of the selected group.

In this way, according to the present embodiment, the color name table is created for each group, and therefore, it is possible to reduce time and labor as compared with the case where the color name table is created for each camera. It is, of course, possible to create two or more color name tables for one group.

Next, a description will be given of a process for creating an image group and metadata serving as a search target from captured images acquired from the cameras 1011, 1012, . . . , 101N by starting image capturing using the cameras after creating and registering the color name table for each group. In the present embodiment, a region of a person (person region) is extracted from the captured image, then a region of upper garments and a region of lower garments are extracted from the person region, and the color of the upper garment region and the color of the lower garment region are recognized, and converted into color names. Then, the color name of the upper garment region and the color name of the lower garment region that have been converted are registered in a database 105 in association with an image in the person region, as metadata for the image in the person region. Such a registration process will be described with reference to the flowchart shown in FIG. 2C.

Figure 2C:
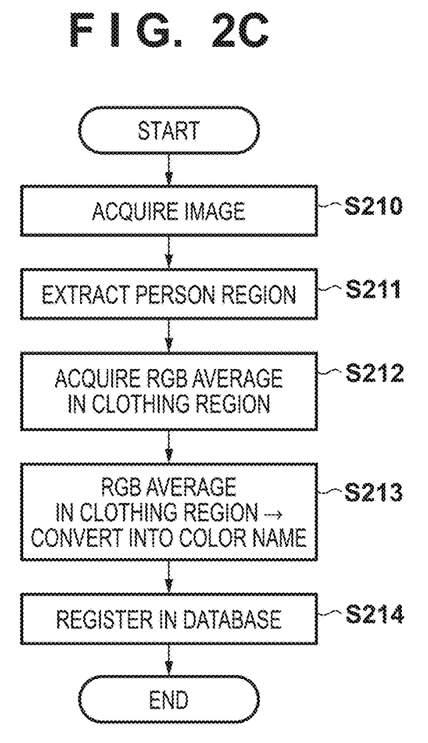

At step S210, a region extraction unit 103 acquires a captured image from each of the cameras 1011, 1012, . . . , 101N. A series of processes from steps S211 to S214 is performed for the captured image acquired from each of the cameras 1011, 1012, . . . , 101N.

At step S211, the region extraction unit 103 extracts a person region from the acquired captured image. The method for extracting a person region from an image is not limited to any specific method, and various methods are available. For example, a method is available in which the face of a person is detected from an image, and a person region is extracted by estimation from the position of the detected face. For face detection, the method described in the following document is available.

Viola and Jones. Rapid Object Detection using a Boosted Cascade of Simple Features. Proceedings of the IEEE Conference on Computer Vision and Pattern Recognition (2001)

When the search target of a face image is limited to images with a relatively good image quality, the efficiency of the process can be increased by limiting the face detection range to a range greater than or equal to a predetermined size. Next, with an upper left coordinate of the rectangular region of the face being fixed, the height of the rectangular shape of the face is multiplied by a constant, and the resultant is used as the person region.

Next, at step S212, a feature extraction unit 1043 extracts the upper garment region and the lower garment region from the person region, and determines the average pixel value of each of the RGB components in the upper garment region and the average pixel value of each of the RGB components in the lower garment region. More specifically, first, the face region is removed from the person region, and the remaining region is equally divided into upper and lower regions. Then, the average pixel value of each of RGB of the pixels belonging to a region included in a circle region having a predetermined radius from the center point of one of the equally divided two regions is determined. For the other of the equally divided two regions as well, the average pixel value of each of RGB components is determined in the same manner.

At step S213, a color name conversion unit 1044 specifies a color name corresponding to the average pixel value of each of the RGB components of the upper garment region and the color name corresponding to the average pixel value of each of the RGB components of the lower garment region by referring to the above-described color name table. The color name table referred to at this time is a color name table registered in association with the group ID of the group (the group of the group ID associated with the camera ID of the camera) to which the camera that has performed image capturing on the captured image from which the upper garment region and the lower garment region are extracted.

That is, assuming that (r, g, b) represents the average pixel values of the respective RGB components of the upper garment region (the lower garment region), the color name (if two or more color names are registered, the two or more color names) registered at the right end of the row on which (r, g, b) is registered in the color name table is specified. Note that if the RGB value matching with the average pixel values is not found in the color name table, the RGB value (included in the color name table) having the smallest Euclidean distance to the average pixel values on the color space is specified, and the color name registered at the right end of the row of the specified RGB value is specified.

At step S214, the color name conversion unit 1044 registers the image (person image) in the person region extracted at step S211 and the color name of the upper garment region and the color name of the lower garment region (metadata) that have been specified at step S213 in the database 105 in association with each other. Note that the metadata may further contain additional information, in addition to the color name of the upper garment region and the color name of the lower garment region. For example, the camera ID of the camera that has performed image capturing on the captured image from which the person region has been extracted, the image capturing date and time of the captured image, the installation location of the camera, and the like may be used as the additional information.

Next, with reference to FIG. 2D, a description will be given of a process for searching for, when the user has input the color name of the upper garments and the color name of the lower garments as a query, a person image having a color name of the upper garments and a color name of the lower garments that respectively match the color name of the upper garments and the color name of the lower garments that have been input as the query, and outputting the person image.

Since the user operates the operation unit (not shown) to input, as a query (search key), the color name of the upper garments and the color name of the lower garments of a person to be searched for, an image search unit 106 acquires, at step S215, the color name of the upper garments and the color name of the lower garments that have been input, as the query. Note that in the case of using the sheet shown in FIG. 3A as the above-described sheet, any of the color names of the 11 colors included in the sheet are only registered in the color name table, and therefore, the color name that is input by the user is also any of the color names of the 11 colors. The color name of the upper garments or the color name of the lower garments is not limited to one, and a plurality of color names may be input.

Note that in addition to the color name of the upper garments and the color name of the lower garments, the user may input information for defining a search range. Examples of such information include the camera ID, the installation location of the camera, and the image capturing date and time (or the range of the image capturing date and time). Thus, when the user has input such information that defines a search range, the image search unit 106 acquires the input information as well.

Next, at step S216, the image search unit 106 searches the database 105 for the metadata that matches the information acquired at step S215 by the image search unit 106, and specifies the person image that is registered in the database 105 in association with the searched metadata.

For example, when the upper garments color name=A and the lower garments color name=B have been input as a query, the image search unit 106 searches for the metadata containing the upper garments color name=A and the lower garments color name=B. When the upper garments color name=A is input as a query (when the color name of the lower garments has not been input as a query), the image search unit 106 searches for the metadata containing the upper garments color name=A. When the lower garments color name=B has been input as a query (when the color name of the upper garments has not been input as a query), the image search unit 106 searches for the metadata containing the lower garments color name=B. When the user has further input image capturing date and time (or a range thereof) as information for defining a search range, the image search unit 106 searches for the metadata containing the input image capturing date and time or the image capturing date and time within the input range of image capturing date and time, from among pieces of the metadata that match the query. Then, the image search unit 106 specifies the person image that is registered in the database 105 in association with the thus searched metadata.

At step S217, the image search unit 106 determines whether the image search of step S216 has been performed for all of the person images registered in the database 105. As used herein, "all of the person images registered in the database 105" refers to person images generated from the captured images captured by the cameras 1011, 1012, . . . , 101N between the present time and the time prior to the current time by a predetermined time. Of course, which set of the person images registered in the database 105 is to be used as a search target is not limited to any specific case. As for the order of search, for example, the order of the search targets may be set such that the person image generated from the captured image captured by the camera 1011 is used first as the search target, and the person image generated from the captured image captured by the camera 1012 is subsequently used as the search target.

Then, if the image search of step S216 has been performed for all of the person images registered in the database 105, the process proceeds to step S218. On the other hand, if, among all of the person images registered in the database 105, there is any person image left for which the image search of step S216 has not yet been performed, the process returns to step S216 in order to use the person image as the search target.

At step S218, the output unit 107 outputs a result of the search performed by the image search unit 106. The output destination and the output form of the search result are not limited to any specific output destination or any specific output form. For example, the search result may be output to a display device that is directly or indirectly connected to the image processing apparatus 100, or may be transmitted to an external apparatus via a network. In the case of displaying the search result, the person images that have been sorted in accordance with, for example, the image capturing date and time may be displayed. Not only the person image, but also other information such as the image capturing date and time may be added to the displayed information.

Variations

Although the present embodiment describes the image search process, taking, as an example, a case where the color name of the upper garments and the color name of the lower garments are input as a query, the content that is input as a query is not limited to the color name of the upper garments and the color name of the lower garments. That is, the content that is input as a query may be the color name of another target object such as the hat worn by a person or a thing carried by a person. In such a case, an image of the target object and the color name derived from the RGB value of the target object contained in the image by using a color name table need to be registered in the database 105 in association with each other (other information may be associated therewith as needed).

In the present embodiment, as the configuration of the sheet, the sheet shown in FIG. 3A, or in other words, the sheet on which color names and patches of the colors associated with the color names are printed is used. However, the configuration of the sheet is not limited to the configuration shown in FIG. 3A as long as color names and colors can be extracted from an image of the sheet. For example, it is possible to use a sheet on which a color circle in which what region corresponds to what color name under a standard light source is set in advance (such a correspondence relation is registered in advance in the image processing apparatus 100) is printed. In the case of capturing an image of such a sheet, when a region of a color is extracted from the captured image and the RGB value in the region is acquired, the RGB value can be registered in association with the color name corresponding to the position of the region. It is also possible to use a sheet on which a character object in which the character representing the color name of a patch is filled with the color of the patch is printed. In the case of using such a sheet, the character represented by the character object and the color thereof are recognized, and the recognized character is registered as the color name corresponding to the recognized color. Although the present embodiment uses RGB as the color components, it is possible to use other color components such as YCC.

Although the present embodiment uses color names as the categories for color classification, it is possible to use any other information as long as colors can be classified. For example, it is possible to use the notation of the Munsell color system, or may arbitrarily classify colors in accordance with the application and manage the colors by respectively assigning symbols thereto. The categories for color classification may be presented to the user as characters or images, or the representative color (e.g., the centroid of the categories on the RGB color space) of the relevant categories may be presented in a color chart.

Although a color name table as shown in FIG. 3A in which RGB values and color names are associated is created in the present embodiment, it is possible to use another method to associate RGB values with color names. For example, functions for associating RGB values with color names may be defined, or a dictionary associating RGB values with color names may be created by using machine learning.

A display screen on which the color names and colors of patches are displayed may be used in place of the sheet on which the color names and colors of patches are printed. In this case, an image of the display screen, in place of the sheet, is captured. That is, as long as a captured image containing the color name and color of a patch can be obtained, the method for presenting the color name and color of a patch to the camera is not limited to any specific method.

Second Embodiment

Figure 4:
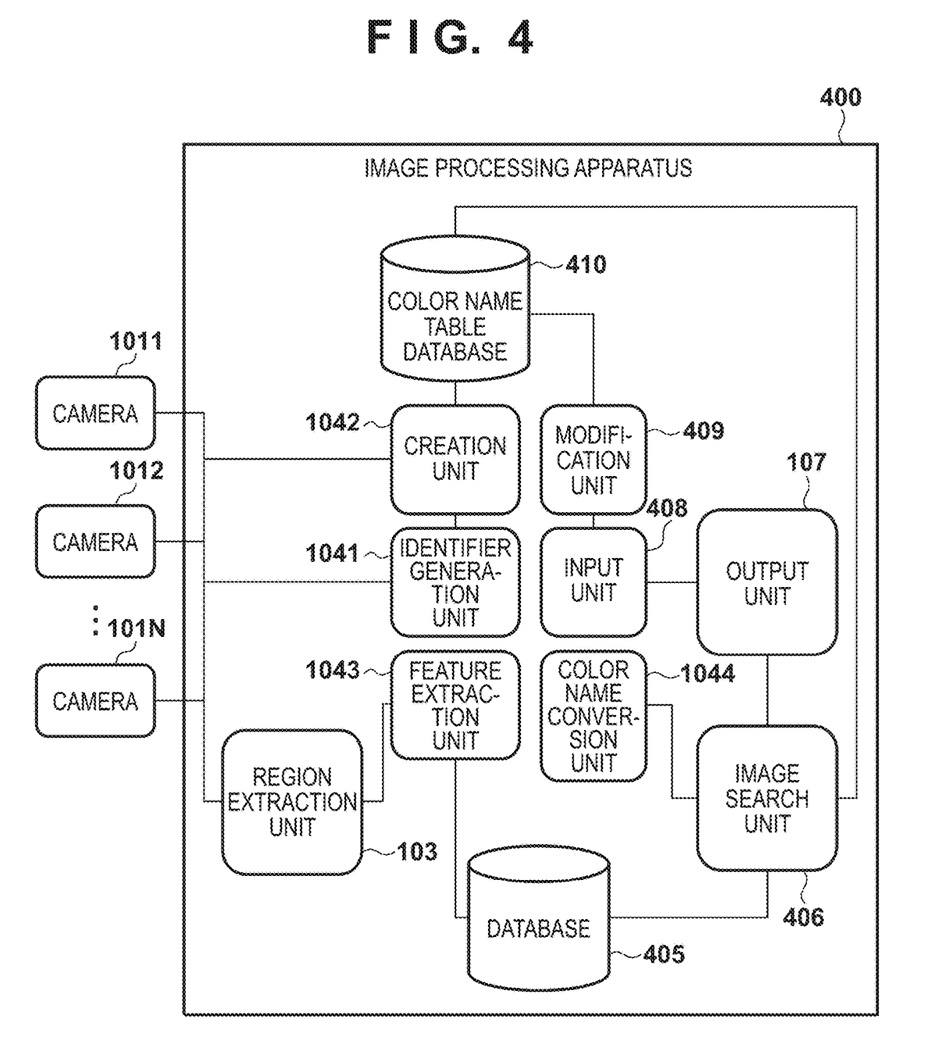
FIG. 4 is a block diagram showing an exemplary configuration of a system.

The following description is focused on the difference with the first embodiment, and the rest of the configuration of the present embodiment is the same as that of the first embodiment unless otherwise mentioned specifically. First, an exemplary configuration of a system according to the present embodiment will be described with reference to the block diagram shown in FIG. 4. In FIG. 4, functional units that are the same as the functional units shown in FIG. 1 are denoted by the same reference numerals, and the description of the functional units has been omitted.

In the present embodiment as well, after each of the cameras 1011, 1012, . . . , 101N has been installed at a prescribed position, an image processing apparatus 400 divides the cameras 1011, 1012, . . . , 101N into camera groups in each of which the cameras capture similar color information. Here, in the first embodiment, the cameras 1011, 1012, . . . , 101N perform image capturing at a prescribed time interval in a prescribed time period, and output captured images. However, in the present embodiment, each of the cameras 1011, 1012, . . . , 101N performs image capturing only once. Thus, in the present embodiment, the identifier generation unit 1041 creates an RGB histogram of the captured image captured by each of the cameras, and divides the cameras 1011, 1012, . . . , 101N into a plurality of groups, based on the RGB histogram of the captured image of each of the cameras. The method for this group division is the same as that of the first embodiment except that the RGB histogram of each of the cameras is used in the present embodiment, whereas the average RGB histogram of each of the cameras is used in the first embodiment. Then, as in the first embodiment, the identifier generation unit 1041 issues an group ID for each of the divided groups, and manages the group ID and the camera IDs of the cameras belonging to the group having the group ID in association with each other.

Next, a color name table is created for each group in the same manner as in the first embodiment. Further, in the present embodiment, the color name table created for a group of interest is duplicated for each of the cameras belonging to the group of interest, and the camera ID of the camera and one of the duplicated color name tables are registered in a color name table database 410 in association with each other. Accordingly, in the color name table database 410, the color name table is registered in association with the camera ID of each camera, and the camera IDs of the cameras belonging to the same group are associated with the color name table created for that group.

Figure 5A:
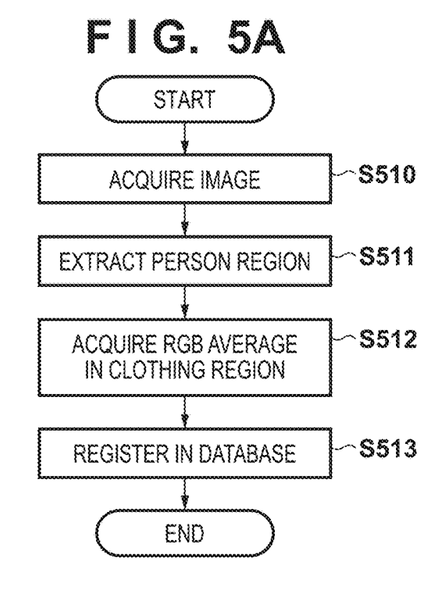
FIGS. 5A and 5B are flowcharts of a process performed by an image processing apparatus 400.

Next, with reference to the flowchart shown in FIG. 5A, a description will be given of a process for creating a person image group and metadata from captured image acquired from the cameras 1011, 1012, ..., 101N by starting image capturing using the cameras. In FIG. 5A, steps S510 to S512 are the same as steps S210 to S212 in FIG. 2C, and therefore, the description of these steps has been omitted.

At step S513, the region extraction unit 103 registers a person image, the camera ID of the camera that has captured the captured image from which the person image has been extracted, and the average pixel value of each of the RGB components in a region of upper garments and a region of lower garments in a database 405 in association with one another.

Figure 5B:
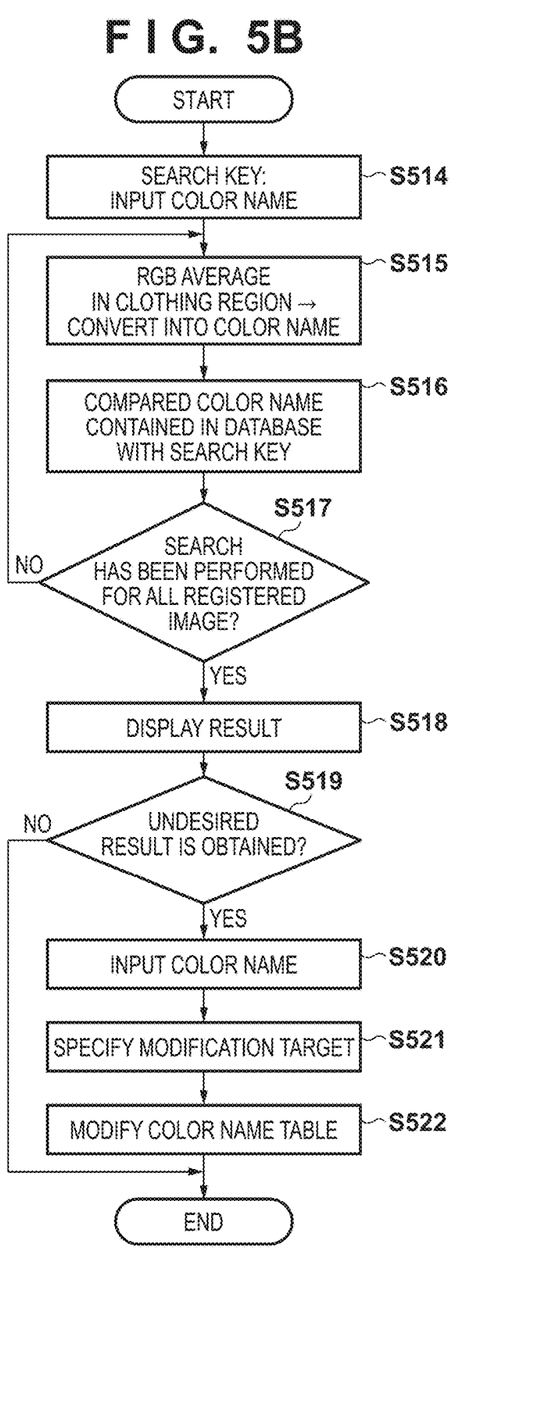

Next, an image search process according to the present embodiment will be described with reference to FIG. 5B, which shows the flowchart of the process. In the present embodiment, a color (e.g., the centroid of the RGB value corresponding to the color name on the RGB color space) representing each of various color names (here, the above-described 11 colors) is displayed on a display screen that is directly or indirectly connected to the image processing apparatus 400. For example, a list of patches of the representative colors respectively corresponding to the above-described 11 colors is displayed on the display screen. The user designates a color of the upper garments and a color of the lower garments from among the colors displayed in the list, and the method for color designation is not limited to any specific designation method. For example, when the display screen is a touch panel screen, the user may touch the display position of the desired color by using his or her own finger or a pointer, or may move a cursor to the display position by using a user interface such as a mouse, and input a determination instruction at that position.

The display position of a color on the display screen and the color name corresponding to the color are associated with each other. Accordingly, at step S514, when the user designates the upper garments color and the lower garments color in the above-described manner, an image search unit 406 acquires the color names corresponding to the designated positions. Accordingly, the color names corresponding to the upper garments color and the lower garments color designated by the user can be acquired as a query.

At step S515, the image search unit 406 performs the following process for each of the person images registered in the database 405. First, the image search unit 406 acquires the color name table corresponding to the camera ID associated with the person image from the color name table database 410. Then, next, the image search unit 406 acquires the color name corresponding to "the average pixel value of each of the RGB components in each of the region of the upper garments and the region of the lower garments" associated with the person image in the acquired color name table. Accordingly, the color name of the upper garments and the color name of the lower garments in the person image can be acquired.

At step S516, the image search unit 406 performs the same image search process as that of step S216 described above by using the color name acquired at step S514, and the color name of the upper garments and the color name of the lower garments in each of the person images acquired at step S515.

At step S517, the image search unit 406 determines whether the image search of step S516 has been performed for all of the person images registered in the database 405, as with step S217 described above. Then, if the image search of step S516 has been performed for all of the person images registered in the database 405, the process proceeds to step S518. On the other hand, if, among all of the person images registered in the database 405, there is any person image left for which the image search of step S516 has not yet been performed, the process returns to step S516 in order to use the person image as a search target. At step S518, the output unit 107 outputs a result of the search performed by the image search unit 406, as with step S218 described above.

Here, it is assumed that the user has determined that a person image having an upper garments color and/or a lower garments color that does not match the input query is contained in the person images as the search results output by the output unit 107. In such a case, the present embodiment provides a configuration for modifying the upper garments color name and/or the lower garments color name into the desired color name in the color name table used at the time of converting the average pixel value corresponding to the person image into a color name. Such a configuration is also effective, for example, when the user has not found a hit in a search result when performing a search by inputting a color in order to search for a desired image, but has found the desired image when performing a search by inputting another color.

If the user determines that a person image (non-conforming image) having an upper garments color and/or a lower garments color that does not match the input query is contained in the person images output by the output unit 107, the user can designate the non-conforming image. The method for designating the non-conforming image is not limited to any specific designation method, and it is possible to use, for example, the same designation method as that used for the above-described color designation. If the non-conforming image has been designated by a user operation, the process proceeds to step S520 via step S519. If the non-conforming image is not designated by a user operation, the process ends via step S519.

In addition to a non-conforming image, the user designates a desired color name as the color name having the average pixel value in the upper garment region and/or a desired color name as the color name having the average pixel value of the lower garment region that are associated with the non-conforming image. That is, if the user determines that the color of the upper garments does not match the input query, the user designates the desired color name as the color name having the average pixel value in the region of the upper garments. If the user determines that the color of the lower garments does not match the input query, the user designates the desired color name as the color name having the average pixel value in the region of the lower garments. The method for designating the color name used at this time is not limited to any specific designation method, and it is possible to use, for example, the same designation method as that used for the above-described color designation. For example, the color name is designated from the above-described 11 colors. At that time, the color name may be designated by displaying 11 colors and the color names of the 11 colors on a display screen. Alternatively, the color defined by the average pixel value corresponding to the non-conforming image may be displayed on a display screen. This allows the user to designate the desired color name, while checking the average pixel value associated with the non-conforming image. Alternatively, the history of the color names that the user has recently searched for may be displayed so as to assist input of the color name. If there is no input of the color name, the changing of the color name is not performed.

At step S520, an input unit 408 acquires the color name (the upper garments color name and/or the lower garments color name) designated by the user. At step S521, the input unit 408 acquires the camera ID and the average pixel value that are associated with the non-conforming image.

At step S522, a modification unit 409 acquires the color name table that is registered in the color name table database 410 in association with the camera ID acquired at step S521. Then, the modification unit 409 registers, in the acquired color name table, the color name acquired at step S520 as the color name corresponding to the average pixel value acquired at step S521.

For example, it is assumed that as a result of the user determining that the color of the upper garments does not match the input query, the desired color name is designated as the color name of the average pixel value in the region of the upper garments. At this time, the modification unit 409 registers, in the acquired color name table, the color name acquired at step S520 as the color name corresponding to the average pixel value of the region of the upper garments that has been acquired at step S521. It is also assumed that as a result of the user determining that the color of the lower garments does not match the input query, the desired color name is designated as the color name having the average pixel value in the region of the lower garments. At this time, the modification unit 409 registers, in the acquired color name table, the color name acquired at step S520 as the color name corresponding to the average pixel value in the region of the lower garments that has been acquired at step S521.

Note that if the average pixel value acquired at step S521 is not registered in the color name table, the RGB value located at the closest distance to the aforementioned average pixel value on the color space is specified, and the color name acquired at step S520 is registered as the color name corresponding to the specified RGB value. In this registration process, in the color name table, the color name that has already been registered as the color name corresponding to the average pixel value acquired at step S521 is updated to the color name acquired at step S520.

In this manner, according to the present embodiment, the acquisition of the RGB histogram during installation of cameras is performed only once, and thereby, the time and labor of grouping the cameras during installation of the cameras can be reduced. According to the present embodiment, the color name table can be modified for each camera, and therefore, it is possible to create a color name table that is customized for each camera, thus preventing a reduction in the search accuracy and enhancing the search accuracy.

Variations

Although the color name table is modified for each camera in the present embodiment, the group to which the camera belongs may also be modified in the same manner. For example, it is assumed that the camera ID corresponding to the non-conforming image is "A". At this time, the modification of the color name table associated with the camera ID=A is also applied in the same manner to the color name table associated with the other camera IDs=B, C, . . . associated with the group ID associated with the camera ID=A.

Note that some or all of the embodiments and variations described above may be combined as appropriate. For example, in the second embodiment, the configuration up to the modification process for the color name table may be performed in the same manner as in the first embodiment.

That is, the configuration of the modification process for the color name table in the second embodiment may be added to the configuration of the first embodiment (in that case, the modification process for the color name table needs to be modified as appropriate in conformity with the first embodiment).

The functional units described as being included in the image processing apparatus in FIGS. 1 and 4 may not be necessarily placed in one image processing apparatus, and may be distributed over two or more apparatuses. For example, in the configuration shown in FIG. 1, the identifier generation unit 1041, the creation unit 1042, the feature extraction unit 1043, and the color name conversion unit 1044 may be implemented by one apparatus, and the region extraction unit 103, the database 105, the image search unit 106, and the output unit 107 may be implemented by two or more apparatuses. In the case of FIG. 4, the identifier generation unit 1041, the creation unit 1042, the feature extraction unit 1043, the color name conversion unit 1044, the modification unit 409, and the input unit 408 may be implemented by one apparatus, and the remaining functional units may be implemented by two or more apparatuses.

Figure 2D:
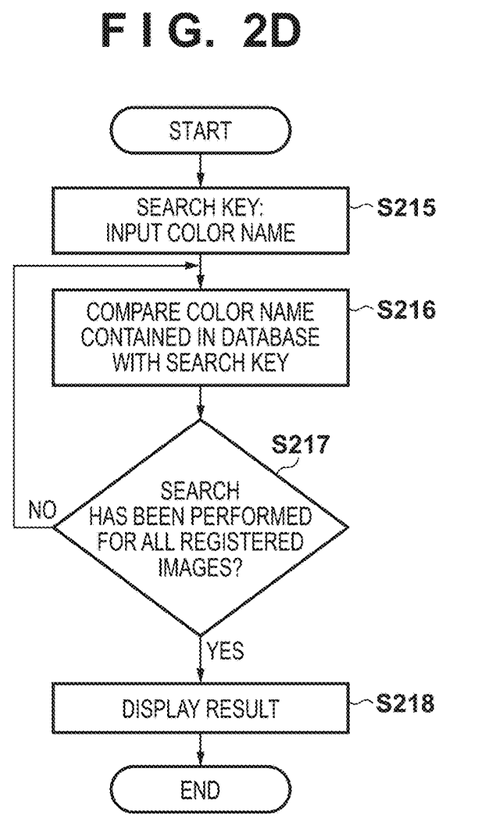

The apparatus that performs the process in accordance with the flowchart shown in FIGS. 2A to 2C (the process in accordance with the flowchart shown in FIG. 5A) and the apparatus that performs the process in accordance with the flowchart shown in FIG. 2D (the process in accordance with the flowchart shown in FIG. 5B) may be separate apparatuses.

In any case, each of the image processing apparatuses 100 and 400 is described as an example of an image processing apparatus having the following configuration, and it is possible to use any configuration as long as it results in the following configuration. That is, a captured image obtained by capturing an image of a surface on which a color chart is disposed such that color information representing a color included in the color chart can be derived is acquired, the color information is derived from the captured image, and the color of the color chart that is contained in the captured image is extracted. Then, the derived color information and the extracted color are registered in association with each other.

Thus, for example, the image processing apparatus is not limited to a configuration in which a captured image is directly acquired from a camera, and it is possible to adopt a configuration in which a captured image that has been output from a camera is stored in a storage device, and the image processing apparatus acquires the captured image by reading it out from the storage device.

Third Embodiment

Figure 6:
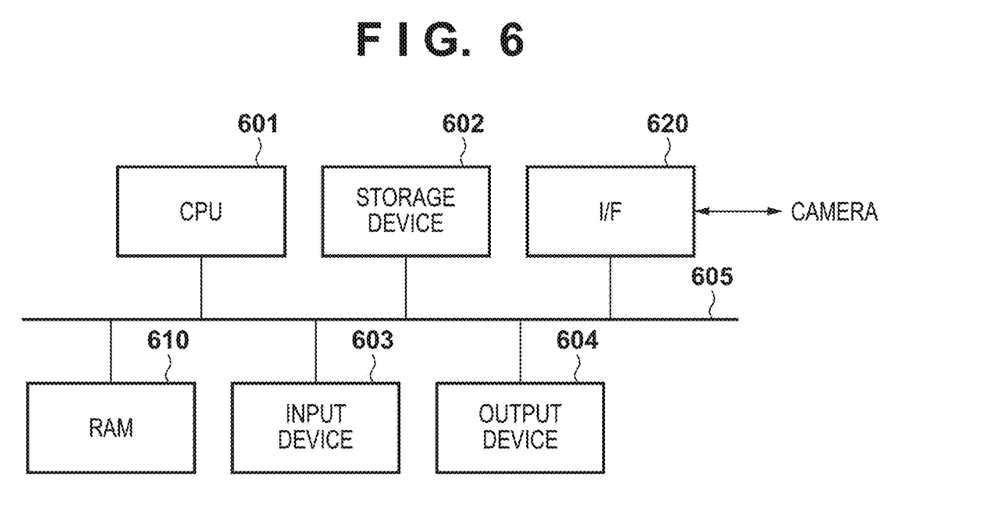
FIG. 6 is a block diagram showing an exemplary hardware configuration of a computer apparatus.

The functional units shown in FIGS. 1 and 4 may be configured with hardware, but may be partly configured with software. For example, in the case of FIG. 1, the region extraction unit 103, the identifier generation unit 1041, the creation unit 1042, the feature extraction unit 1043, the color name conversion unit 1044, the image search unit 106, and the output unit 107 may be configured with software. In the case of FIG. 4, the region extraction unit 103, the identifier generation unit 1041, the creation unit 1042, the feature extraction unit 1043, the color name conversion unit 1044, the modification unit 409, the input unit 408, the image search unit 406, and the output unit 107 may be configured with software. In such a case, any computer apparatus capable of executing such software is applicable to the image processing apparatus 100/400. An exemplary hardware configuration of a computer apparatus applicable to the image processing apparatus 100/400 will be described with reference to the block diagram shown in FIG. 6. Note that the hardware configuration shown in FIG. 6 is merely an example of the hardware configuration of the computer apparatus applicable to the image processing apparatus 100/400.

By executing processes by using a computer program and data that are stored in a RAM 610, a CPU 601 performs overall operation control of the computer apparatus and executes or controls the processes described above as being executed by the image processing apparatus 100/400.

The RAM 610 has an area for storing a computer program and data that are loaded from a storage device 602. Further, the RAM 610 has an area for storing captured images and camera IDs received from the cameras 1011, 1012, ..., 101N via an I/F (interface) 620. Further, the RAM 610 has a work area used by the CPU 601 to execute or control various processes. In this manner, the RAM 610 can provide various areas as needed.

The storage device 602 is a mass information storage device typified by a hard disk drive device. An OS (operating system) and a computer program and data for causing the CPU 601 to execute or control the processes described above as being executed by the image processing apparatuses 100/400 are saved in the storage device 602. The computer program includes a computer program for causing the CPU 601 to implement the functions of the region extraction unit 103, the identifier generation unit 1041, the creation unit 1042, the feature extraction unit 1043, the color name conversion unit 1044, the image search unit 106, and the output unit 107. Alternatively, the computer program includes a computer program for causing the CPU 601 to implement the functions of the region extraction unit 103, the identifier generation unit 1041, the creation unit 1042, the feature extraction unit 1043, the color name conversion unit 1044, the modification unit 409, the input unit 408, the image search unit 406, and the output unit 107. The data saved in the storage device 602 includes the information described as the known information in the above description and the information described as a management target (registration target) in the above description. The database 105, the database 405, and the color name table database 410 that are described above are created in the storage device 602. The computer program and data saved in the storage device 602 are loaded as needed onto the RAM 610 in accordance with control by the CPU 601, and are used as processing targets of the CPU 601.

The above-described cameras 1011, 1012, 101N are connected to the I/F 620, and the computer apparatus of the present embodiment performs data communication between the cameras 1011, 1012, ..., 101N via the I/F 620.

An input device 603 is configured with user interfaces such as a mouse and a keyboard, and allows various instructions to be input into the CPU 601 by being operated by the user. For example, each of the user operations in the above description can be implemented by the user operating the input device 603.

An output device 604 is configured with a CRT, a liquid crystal screen or the like, and can display the result of processing executed by the CPU 601 by using images, characters and the like. For example, the output device 604 can display GUIs (graphical user interfaces) for the above-described various user operations, search results and the like. Alternatively, the input device 603 and the output device 604 may be integrated with each other to form a touch panel screen. All of the CPU 601, the RAM 610, the storage device 602, the I/F 620, the input device 603, and the output device 604 are connected to a bus 605.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-097386, filed May 13, 2016, which is hereby incorporated by reference herein in its entirety.

What is claimed is:

1. An image processing apparatus comprising:
one or more processors; and
a memory coupled to the one or more processors, the memory having stored thereon instructions which, when executed by the one or more processors, cause the image processing apparatus to:
  acquire, for each of a plurality of image-capturing environments, a captured image obtained by capturing under the image-capturing environment a surface on which a color chart is disposed;
  extract color values from colored regions classified as an identical color in the color chart that is contained in the captured image, and extract color information representing the identical color from the color chart;
  register the color information and the color values, both of which are extracted from the color chart that is contained in the captured image, in association with each other,
  wherein, in a case where a first color value extracted from a first colored region in the color chart that is contained in a first captured image of the surface that has been captured under a first image-capturing environment is equal to a second color value extracted from a second colored region in the color chart that is contained in a second captured image of the surface that has been captured under a second image-capturing environment, first color information, representing the identical color into which the first colored region in the first captured image is classified, and second color information, different from the first color information, representing the identical color into which the second colored region in the second captured image is classified, are registered with the same color value;

acquire an image of an object;

acquire a color value of the object that is contained in the image of the object;

specify color information which has been registered in association with a color value corresponding to the acquired color value of the object; and register the image of the object and the specified color information in association with each other.

2. The image processing apparatus according to claim 1, wherein the instructions, when executed by the one or more processors, further cause the image processing apparatus to:

divide a plurality of image capturing devices into a plurality of groups, based on histograms of colors extracted from captured images respectively captured by the plurality of image capturing devices, wherein acquire captured images of the surface that have been captured under the plurality of image-capturing environments by one selected image capturing device selected from the group.

3. The image processing apparatus according to claim 2, wherein in extracting from the color chart, the instructions, when executed by the one or more processors, cause the image processing apparatus to:

perform the extraction of the color values and the color information, respectively, on each of the captured images of the surface that have been captured under the plurality of image-capturing environments by the selected image capturing device.

4. The image processing apparatus according to claim 3, wherein in registering the color information and the color values, the instructions, when executed by the one or more processors, cause the image processing apparatus to:

register the color information and the color values, both of which are extracted by the extracting, for each of the captured images of the surface that have been captured under the plurality of image-capturing environments by the selected image capturing device, in association with a corresponding one of the groups.

5. The image processing apparatus according to claim 1, wherein the colored regions included in the color chart are disposed on the surface in association with the color information.

6. The image processing apparatus according to claim 1, wherein for each of the colored regions classified into the identical color, a character object that forms the colored region and has the color value of the colored region is disposed on the surface.

7. The image processing apparatus according to claim 1, wherein in the extracting from the color chart, the instructions, when executed by the one or more processors, cause the image processing apparatus to:

in extracting the color values and color information, extract a color value of a character object in the color chart and recognize the character object as the color information.

8. A search apparatus for searching for an image registered by an image processing apparatus, the image processing apparatus comprising:

one or more processors; and a memory coupled to the one or more processors, the memory having stored thereon instructions which, when executed by the one or more processors, cause the image processing apparatus to:

acquire, for each of a plurality of image-capturing environments, a captured image obtained by capturing under the image-capturing environment a surface on which a color chart is disposed;

extract color values from colored regions classified as an identical color in the color chart that is contained in the captured image, and extract color information representing the identical color from the color chart;

register the color information and the color values, both of which are extracted from the color chart that is contained in the captured image, in association with each other, wherein, in a case where a first color value extracted from a first colored region in the color chart that is contained in a first captured image of the surface that has been captured under a first image-capturing environment is equal to a second color value extracted from a second colored region in the color chart that is contained in a second captured image of the surface that has been captured under a second image-capturing environment, first color information, representing the identical color into which the first colored region in the first captured image is classified, and second color information, different from the first color information, representing the identical color into which the second colored region in the second captured image is classified, are registered with the same color value;

acquire an image of an object;

acquire a color value of the object that is contained in the image of the object;

specify color information which has been registered in association with a color value corresponding to the acquired color value of the object; and register the image of the object and the specified color information in association with each other; and the search apparatus comprising:

one or more second processors; and a memory coupled to the one or more second processors, the memory having stored thereon second instructions which, when executed by the one or more second processors, cause the search apparatus to:

search for an image of an object registered in association with color information which matches color information that has been input as a query; and output a result of the search.

9. The search apparatus according to claim 8, wherein the instructions, when executed by the one or more processors, further cause the image processing apparatus to:

update, to color information designated by a user, the color information registered in association with an image designated by the user from among images searched.

10. An image processing method comprising:

acquiring, for each of a plurality of image-capturing environments, a captured image obtained by capturing under the image-capturing environment a surface on which a color chart is disposed;

extracting color values from colored regions classified as an identical color in the color chart that is contained in the captured image, and extract color information representing the identical color from the color chart;

registering the color information and the extracted color values, both of which are extracted from the color chart that is contained in the captured image, in association with each other, wherein, in a case where a first color value extracted from a first colored region in the color chart that is contained in a first captured image of the surface that has been captured under a first image-capturing environment is equal to a second color value extracted from a second colored region in the color chart that is contained in a second captured image of the surface that has been captured under a second image-capturing environment, first color information representing the identical color into which the first colored region in the first captured image is classified, and second color information, different from the first color information, representing the identical color into which the second colored region in the second captured image is classified are registered with the same color value;

acquiring an image of an object;

acquiring a color value of the object that is contained in the image of the object;

specifying color information which has been registered in association with a color value corresponding to the acquired color value of the object; and registering the image of the object and the specified color information in association with each other.

* * * * *